United States Patent
Hakola et al.

(10) Patent No.: US 9,554,314 B2
(45) Date of Patent: *Jan. 24, 2017

(54) METHOD AND APPARATUS FOR PROVIDING CELL RE-SELECTION

(71) Applicant: Nokia Technologies Oy, Espoo (FI)

(72) Inventors: Sami-Jukka Hakola, Oulu (FI); Karri Ranta-Aho, Espoo (FI); Markus Klaus Andrea Wimmer, Wroclaw (PL); Thomas Stadler, Vienna (AT)

(73) Assignee: NOKIA TECHNOLOGIES OY, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 14/802,583

(22) Filed: Jul. 17, 2015

(65) Prior Publication Data

US 2015/0334619 A1 Nov. 19, 2015

Related U.S. Application Data

(63) Continuation of application No. 12/265,053, filed on Nov. 5, 2008, now Pat. No. 9,185,622.

(60) Provisional application No. 60/985,537, filed on Nov. 5, 2007.

(51) Int. Cl.
*H04W 36/14* (2009.01)
*H04W 68/00* (2009.01)
*H04W 36/30* (2009.01)
*H04W 84/04* (2009.01)

(52) U.S. Cl.
CPC ............. *H04W 36/14* (2013.01); *H04W 36/30* (2013.01); *H04W 68/005* (2013.01); *H04W 84/042* (2013.01)

(58) Field of Classification Search
CPC ....... H04W 36/14; H04W 68/00; H04W 36/30
USPC .................................................. 455/436–438
See application file for complete search history.

(56) References Cited

U.S. PATENT DOCUMENTS

| 7,586,875 | B2 | 9/2009 | Landais et al. |
| 8,036,169 | B2 | 10/2011 | Kuo et al. |
| 8,774,104 | B2 * | 7/2014 | Pelletier ............... H04W 72/12 370/329 |
| 2005/0041608 | A1 | 2/2005 | Jeong et al. |
| 2005/0227692 | A1 | 10/2005 | Kawashima et al. |
| 2005/0237976 | A1 | 10/2005 | Walldeen et al. |
| 2006/0280145 | A1 | 12/2006 | Revel et al. |

(Continued)

FOREIGN PATENT DOCUMENTS

| CN | 1522093 A | 8/2004 |
| EP | 1206154 A2 | 5/2002 |

(Continued)

OTHER PUBLICATIONS

Office Action for corresponding Japanese Patent Application No. 2013-042719, dated Jan. 7, 2014, 11 Pages.

(Continued)

*Primary Examiner* — Michael T Vu
(74) *Attorney, Agent, or Firm* — Ditthavong & Steiner, P.C.

(57) ABSTRACT

An approach is provided for cell re-selection. A notification message is generated to indicate initiation of a coverage area re-selection procedure to operate in a new coverage area from a current coverage area. The re-selection procedure is performed if an acknowledgement message is received in response to the notification message.

12 Claims, 11 Drawing Sheets

(56) References Cited

U.S. PATENT DOCUMENTS

2007/0025300 A1* 2/2007 Terry ................. H04W 52/346
                                                                                 370/335
2008/0192687 A1 8/2008 Kuo et al.
2011/0007716 A1 1/2011 Revel et al.

FOREIGN PATENT DOCUMENTS

| EP | 1758424 A1 | 2/2007 |
| --- | --- | --- |
| JP | 2005277815 A | 10/2005 |
| WO | 2006031588 A2 | 3/2006 |
| WO | 2006122233 A2 | 11/2006 |

OTHER PUBLICATIONS

Office Action for corresponding Japanese Patent Application No. 2010-531640, dated Dec. 28, 2012, with English-language summary, 4 pages.
Office Action for corresponding Chinese Patent Application No. 200880123557.7, dated Sep. 24, 2012, 9 pages.
Office Action for corresponding Japanese Patent Application No. 2010-531640, dated Mar. 27, 2012, 17 pages.
International Preliminary Report on Patentability for corresponding International Application No. PCT/IB2008/054623, dated May 11, 2010, 6 pages.
International Search Report and Written Opinion for corresponding International Application No. PCT/IB2008/054623, dated Mar. 26, 2009, 12 pages.

\* cited by examiner

METHOD AND APPARATUS FOR PROVIDING CELL RE-SELECTION

RELATED APPLICATIONS

This application is a continuation of U.S. application Ser. No. 12/265,053, filed Nov. 5, 2008, which claims the benefit of the earlier filing date under 35 U.S.C. §119(e) of U.S. Provisional Application Ser. No. 60/985,537 filed Nov. 5, 2007, entitled "Method and Apparatus for Providing Cell Re-selection," the entirety of which is incorporated herein by reference.

BACKGROUND

Radio communication systems, such as wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves cell re-selection when a mobile device moves from one cell to another cell. Traditionally, such movement involves unnecessarily reserving network resources—i.e., wasting network capacity.

SOME EXEMPLARY EMBODIMENTS

Therefore, there is a need for an approach for providing an efficient cell re-selection procedure, in the context of existing and developing standards.

According to one embodiment of the invention, a method comprises generating a notification message indicating initiation of a coverage area re-selection procedure to operate in a new coverage area from a current coverage area. The method also comprises performing the re-selection procedure in response to the notification message.

According to another embodiment of the invention, a computer-readable storage medium carries one or more sequences of one or more instructions which, when executed by one or more processors, cause the one or more processors to perform a method comprising generating a notification message indicating initiation of a coverage area re-selection procedure to operate in a new coverage area from a current coverage area. The method also comprises performing the re-selection procedure in response to the notification message.

According to another embodiment of the invention, an apparatus comprises a re-selection logic configured to generate a notification message indicating initiation of a coverage area re-selection procedure to operate in a new coverage area from a current coverage area. The re-selection logic is further configured to perform the re-selection procedure in response to the notification message.

According to another embodiment of the invention, a method comprises receiving a notification message indicating initiation of a coverage area re-selection procedure to operate in a new coverage area from a current coverage area. The method also comprises generating an acknowledgement message to permit executing the re-selection procedure in response to the notification message.

According to another embodiment of the invention, a computer-readable storage medium carries one or more sequences of one or more instructions which, when executed by one or more processors, cause the one or more processors to perform a method comprising receiving a notification message indicating initiation of a coverage area re-selection procedure to operate in a new coverage area from a current coverage area. The method also comprises generating an acknowledgement message to permit executing the re-selection procedure in response to the notification message.

According to another embodiment of the invention, an apparatus comprises a re-selection logic configured to receive a notification message indicating initiation of a coverage area re-selection procedure to operate in a new coverage area from a current coverage area. The re-selection logic is further configured to generate an acknowledgement message to permit executing the re-selection procedure in response to the notification message.

According to another embodiment of the invention, a method comprises allocating resource to a user equipment. The method also comprises determining whether the user equipment is in a coverage area re-selection state. The method further comprises restricting execution of a coverage area re-selection procedure if the user equipment is in a coverage area re-selection state and is currently assigned with dedicated uplink transmission resources.

According to another embodiment of the invention, a computer-readable storage medium carries one or more sequences of one or more instructions which, when executed by one or more processors, cause the one or more processors to perform a method comprising determining whether the user equipment is in a coverage area re-selection state. The method further comprises restricting execution of a coverage area re-selection procedure if the user equipment is in a coverage area re-selection state and is currently assigned with dedicated uplink transmission resources.

According to yet another embodiment of the invention, an apparatus comprises a resource allocation logic configured to allocate resource to a user equipment, and to determine whether the user equipment is in a coverage area re-selection state. The apparatus also comprises a re-selection logic configured to restrict a coverage area re-selection procedure if the user equipment is in the coverage area re-selection state and is currently assigned with dedicated uplink transmission resources.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

An apparatus, method, and software for providing efficient cell re-selection procedure. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with a 3GPP WCDMA (Wideband Code Division Multiple Access) or UTRAN (UMTS (Universal Mobile Telecommunications System) Terrestrial Radio Access Network)) architecture, it is recognized by one of ordinary skill in the art that the embodiments of the inventions have applicability to any type of packet based communication system and equivalent functional capabilities.

Figure 1:
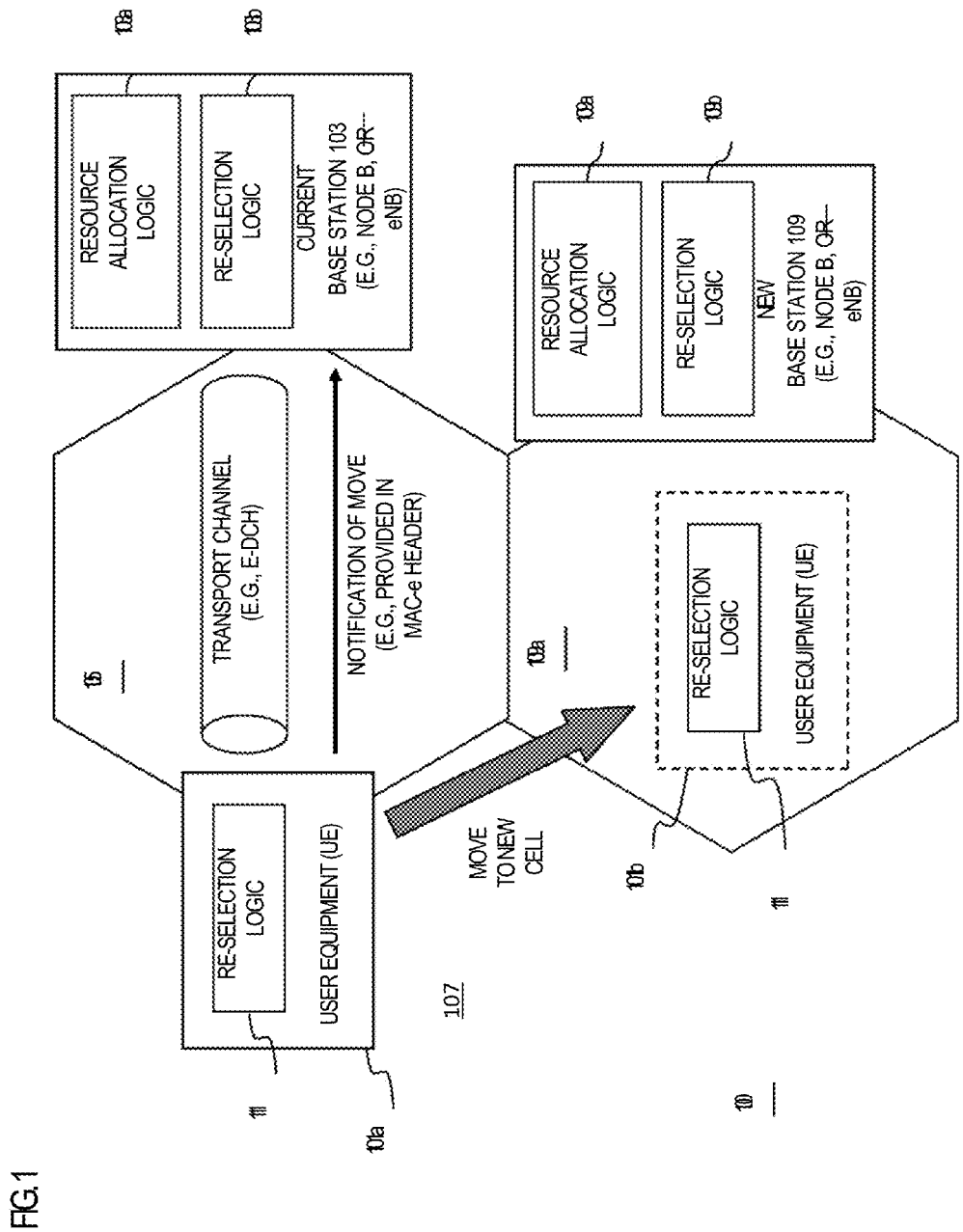
FIG. 1 is a diagram of a communication system capable of providing efficient cell re-selection process, according to an exemplary embodiment.

FIG. 1 is a diagram of a communication system capable of providing efficient cell re-selection process, according to an exemplary embodiment. As shown in FIG. 1, a communication system 100 includes one or more user equipment (UEs) 101 communicating with a base station 103, which is part of an access network (e.g., WCDMA (Wideband Code Division Multiple Access), HSPA (High Speed Packet Access), WiMAX, 3GPP LTE (or E-UTRAN or Beyond 3G, 4G), etc.). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The system 100 provides for notification by a UE 101a to a current base station 103 within one radio coverage area 105 of the UE's move to another radio coverage area 107 (e.g., cell). Alternatively, according to other embodiments, when resources are dedicated to the UE 101a, the UE 101a is restricted from performing re-selection of the coverage area 105.

Upon leaving the current coverage area 105, the UE 101a enters the new coverage area 107; this movement is depicted as a UE 101b in the coverage area 107. Assuming the re-selection process is permissible, the UE 101b is now served by a new base station 109. Each of the base stations 103, 109 includes a resource allocation logic 103a, 109a (respectively) for allocating resources to the UE 101 to communicate within the corresponding coverage area 105, 107. In addition, the base stations 103, 109 may include a re-selection logic 103b, 109b to operate in conjunction with the UE 101 to provide the coverage area (e.g., cell) re-selection procedure efficiently, as more fully described below. Likewise, UE 101 has a re-selection logic 111.

Figure 8A:
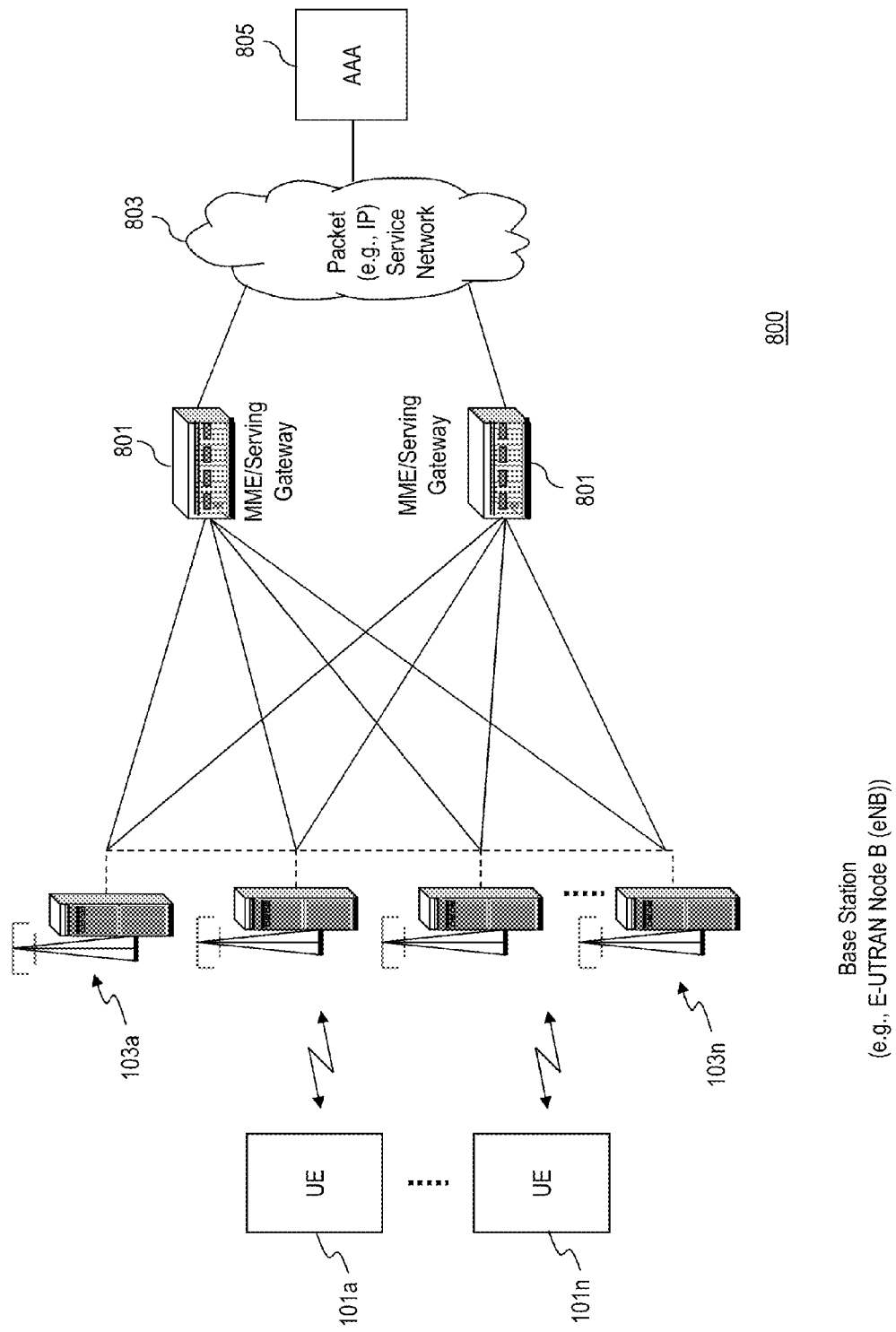
FIGS. 8A-8C are diagrams of communication systems having exemplary long-term evolution (LTE) and E-UTRA (Evolved Universal Terrestrial Radio Access) architectures, in which the system of FIG. 1 can operate to provide detection of a compatible network, according to various exemplary embodiments.
Figure 8B:
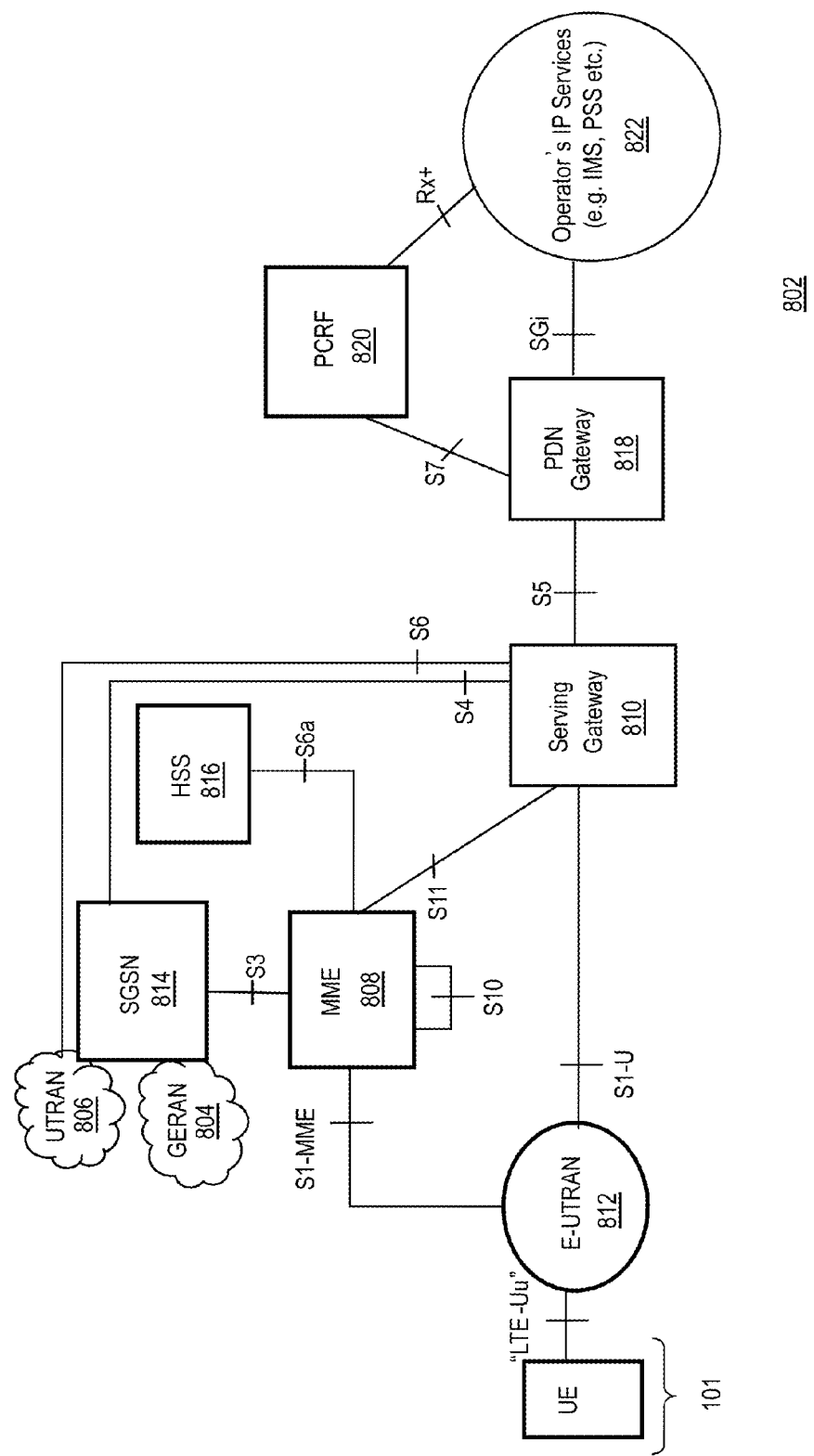
Figure 8C:
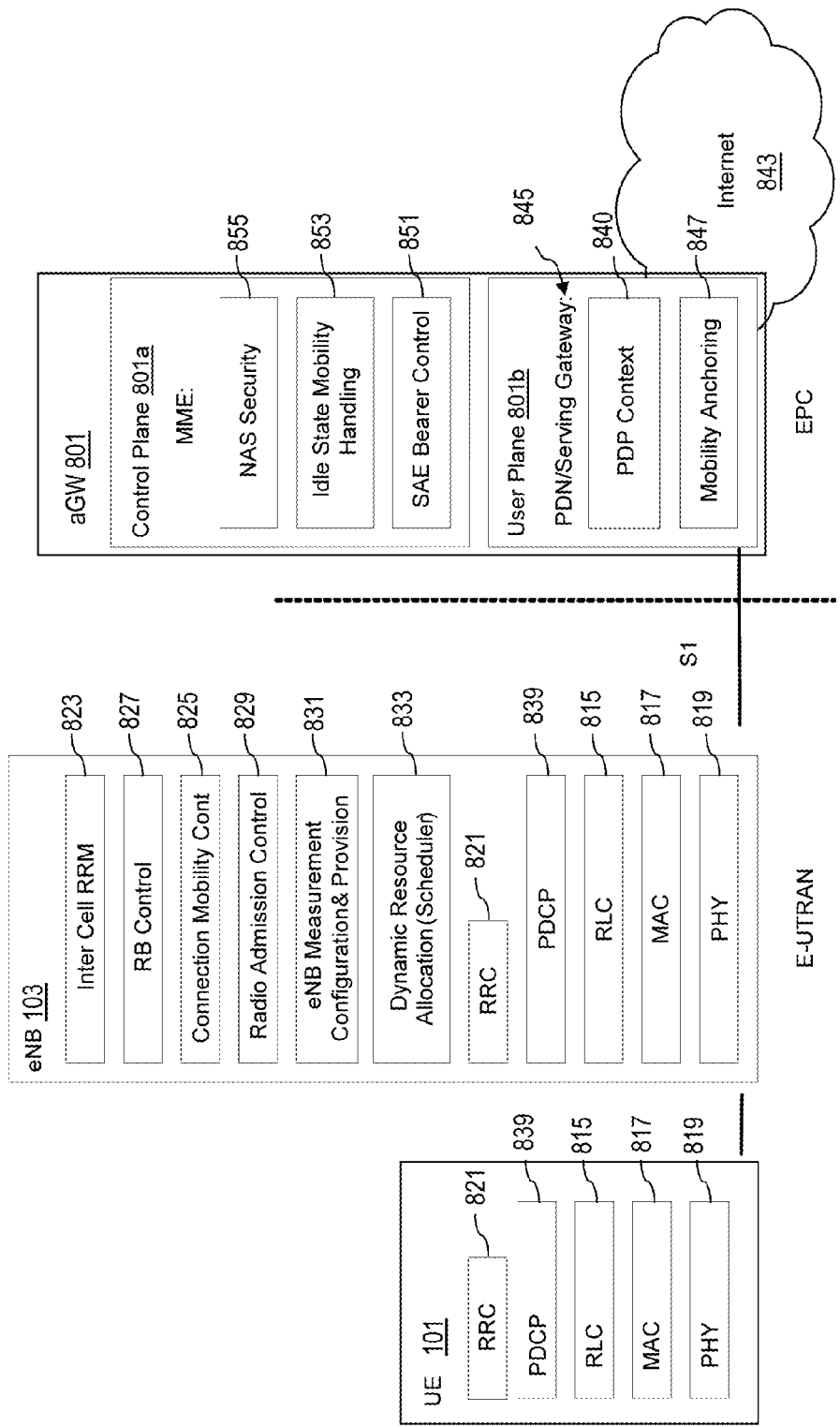

In WCDMA, for example, cell re-selection logic may reside elsewhere on the network side; e.g., such logic can be deployed in the radio network controller (RNC) (or radio resource controller (RRC)). Under the 3GPP terrestrial radio access network architecture (as shown in FIGS. 8A-8C), each of the base stations 103, 109 is denoted as Node B or an enhanced Node B (eNB). The base stations 103, 109, in an exemplary embodiment, use WCDMA (Wideband Code Division Multiple Access) as the uplink and downlink transmission scheme.

In an exemplary embodiment, the Node B 103, 109 can utilize a hybrid Automatic Repeat Request (ARQ) (HARQ) scheme. Automatic Repeat Request (ARQ) is a retransmission mechanism used on the link layer if the transmission was not received successfully. HARQ, which combines ARQ protocols with forward-error-correction (FEC) schemes, provides a sound error-control technique for wireless links. This mechanism permits the receiver to indicate to the transmitter that a packet or sub-packet has been received incorrectly, and thus, requests the transmitter to resend the particular packet(s). Further in HARQ technique the receiver can utilize information received with the failed transmission attempt in combination with the retransmission when reconstructing the transmitted packet Traditionally, in a cell-re-selection procedure, a UE does not provide any indication to the Node B of current cell about moving to a new cell. UE would simply start a cell update ("CELL_UPDATE") procedure in the new cell by sending a CELL_UPDATE message on a transport channel (e.g., R'99 RACH).

According to certain embodiments, an Enhanced Dedicated Channel (E-DCH) is utilized as a data transmission channel in the CELL_FACH (cell forward access channel) state. E-DCH resources for the UE (resources handled by the Node B of the cell UE is connected to) in the cell can be allocated for a relatively long time when comparing to a traditional CELL_FACH access method using, e.g., at most 20 ms long random access channel. During this allocation, the UE may want to change a cell based on a cell re-selection criteria (e.g., defined by a standard). If the UE utilizes the traditional cell re-selection mechanism, the Node B of the current cell is not notified. Consequently, the UE would change the cell, and the Node B would unnecessarily maintain E-DCH resources of this UE.

Figure 2:
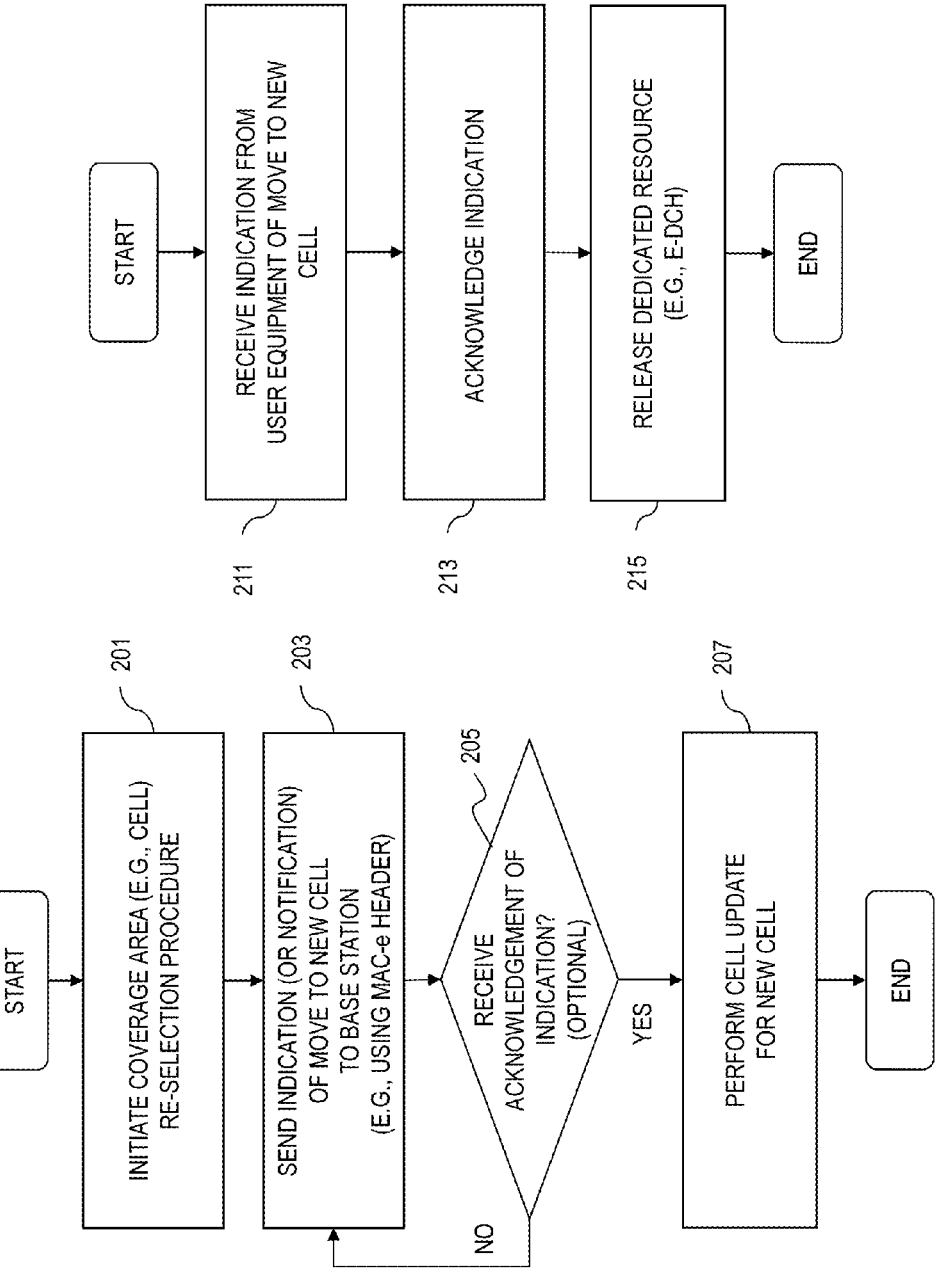
FIGS. 2A and 2B are flowcharts of a coverage area re-selection process involving signaling of movement from a current coverage area to a new coverage area, according to various exemplary embodiments.
Figure 3:
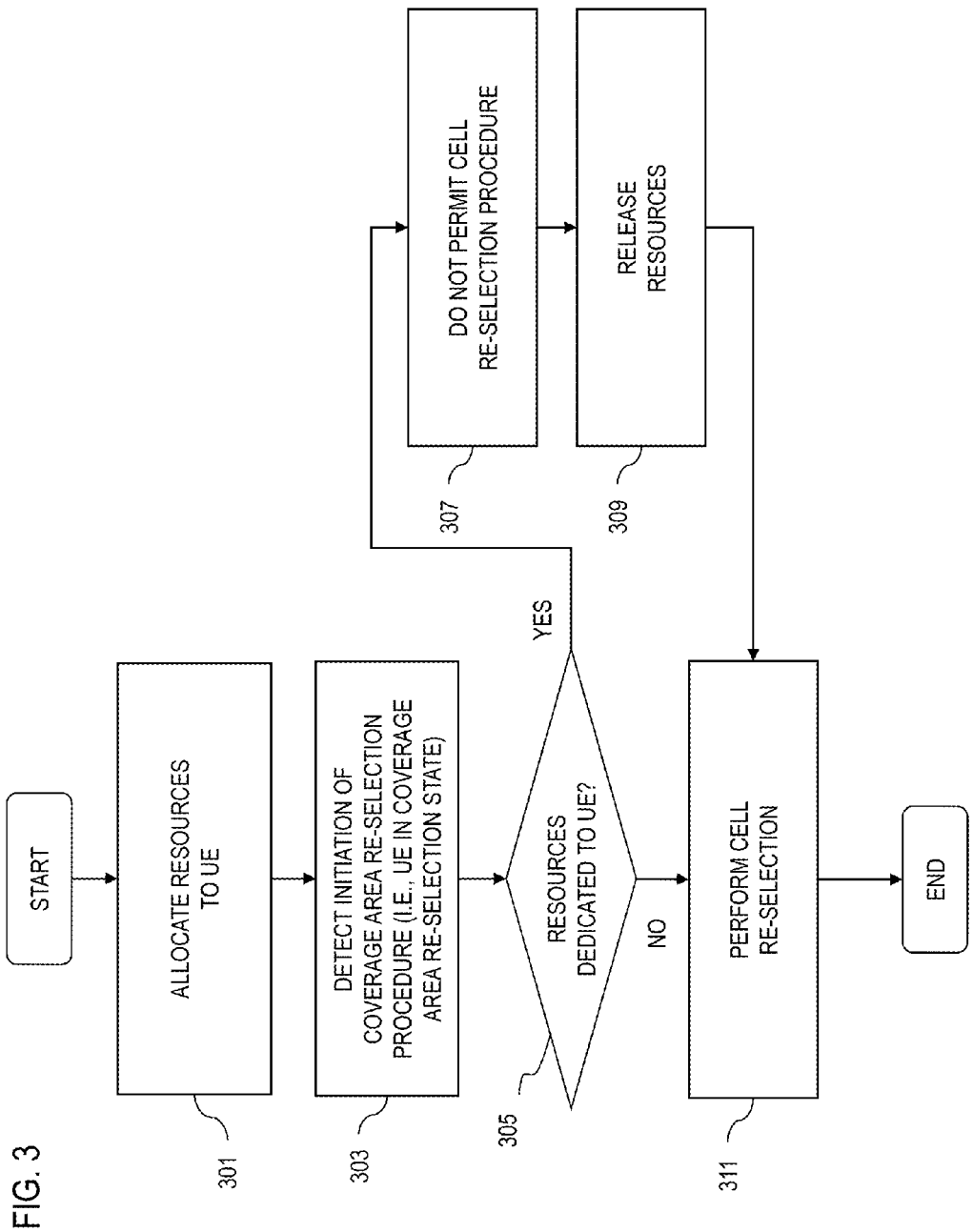
FIG. 3 is a flowchart of a process for temporarily disabling a coverage area re-selection procedure, according to an exemplary embodiment.

In recognition of the above problem, the coverage area (e.g., cell) re-selection procedure of system 100 permits the UE 101 to notify the current base station of movement to another coverage area. Two approaches are described: FIGS. 2A and 2B present the first approach, and FIG. 3 depicts the second approach.

FIGS. 2A and 2B are flowcharts of a coverage area re-selection process involving signaling of movement from a current coverage area to a new coverage area, according to various exemplary embodiments. By way of example, this process is described with respect to the system 100 of FIG. 1. Under this scenario, the UE 101 communicates with the current base station 103a associated with the coverage area 105, which is the current coverage area. Upon moving to another coverage area 107, which is served by the new base station 109.

As seen in FIG. 2A, in step 201, the UE 101a initiates a cell re-selection procedure, which can be triggered by movement into the new coverage area 107. Thereafter, the UE 101 sends an indication of the move to the current base station 103, per step 203. In other words, when the UE 101 has E-DCH resources allocated to it in CELL_FACH state with enhanced uplink in use (i.e., Node B has allocated E-DCH resources) and when UE 101 wants to change cell, the UE 101 will indicate to the Node B (e.g., base station 103) of current cell that it plans to release E-DCH resources from the current cell. The Node B 103, as in can then acknowledge this indication. If the acknowledgement of the indication is received (as determined in step 205), a cell update is performed for the new cell 107.

On the network or base station side (shown in FIG. 2B), the current base station 103 receives the indication of the move from the UE 101, and appropriately acknowledges (steps 211 and 213). In an exemplary embodiment, the indication can be sent, for example, in a MAC (Medium Access Control)-e header to the current Node B 103. Accordingly, the current base station 103 can timely release dedicated resources, as in step 215. In an exemplary embodiment, the dedicated resources (e.g., E-DCH resources) are immediately released to be available for some other UE 101. These resources have been previously allocated using the resource allocation logic 103a within the Node B 103, for instance.

That is, after sending the indication and (optionally) receiving acknowledgement, the UE 101 will release the dedicated resources used for transmission and perform CELL_UPDATE into the new cell. Using the above approach, the current Node B 103 can know when UE 101 wants to release resources, for example, when UE 101 seeks to change a cell in CELL_FACH state when UE 101 has E-DCH resources in CELL_FACH state. However, it is noted that in a UTRAN system, in order to facilitate inter-frequency or inter-radio access technology measurements, compressed mode or a similar technique would have to be always active in CELL_FACH state because UTRAN has no means to initiate Compressed mode when UE has E-DCH resources in CELL_FACH state. Intra-frequency measurements however, can be performed normally.

FIG. 3 is a flowchart of a process for temporarily disabling a coverage area re-selection procedure, according to an exemplary embodiment. In step 301, resources (e.g., E_DCH resources) are allocated to the UE 101. Subsequently, the process detects initiation of cell re-selection procedure (step 303), and determines whether resources have been dedicated to the UE 101 (step 305). Per step 307, the process does not permit execution of the re-selection procedure when the UE 101 has E-DCH resources in CELL_FACH state (e.g., Node B 103 has allocated E-DCH resources). That is, the UE 101 is not allowed to perform cell re-selection as long as it has E-DCH resources reserved. According to one embodiment, the cell re-selection procedure will only occur when the UE 101 does not have a shared E-DCH resource (that has been allocated to it).

After the UE 101 has released (also Node B 103 has released) the resources (as in step 309), the UE 101 can perform cell re-selection (step 311)—e.g., via a traditional cell re-selection logic and using the CELL_UPDATE procedure. In other words, the UE 101 in CELL_FACH state typically runs its re-selection logic. However, when the UE 101 is transmitting over E-DCH or is running the HS-RACH procedure, in general the UE 101 will not perform re-selection until the resources are released. This approach would address the inter-frequency and inter-radio access technology measurement problem without a need for introducing a compressed mode or similar technique.

Figure 4:
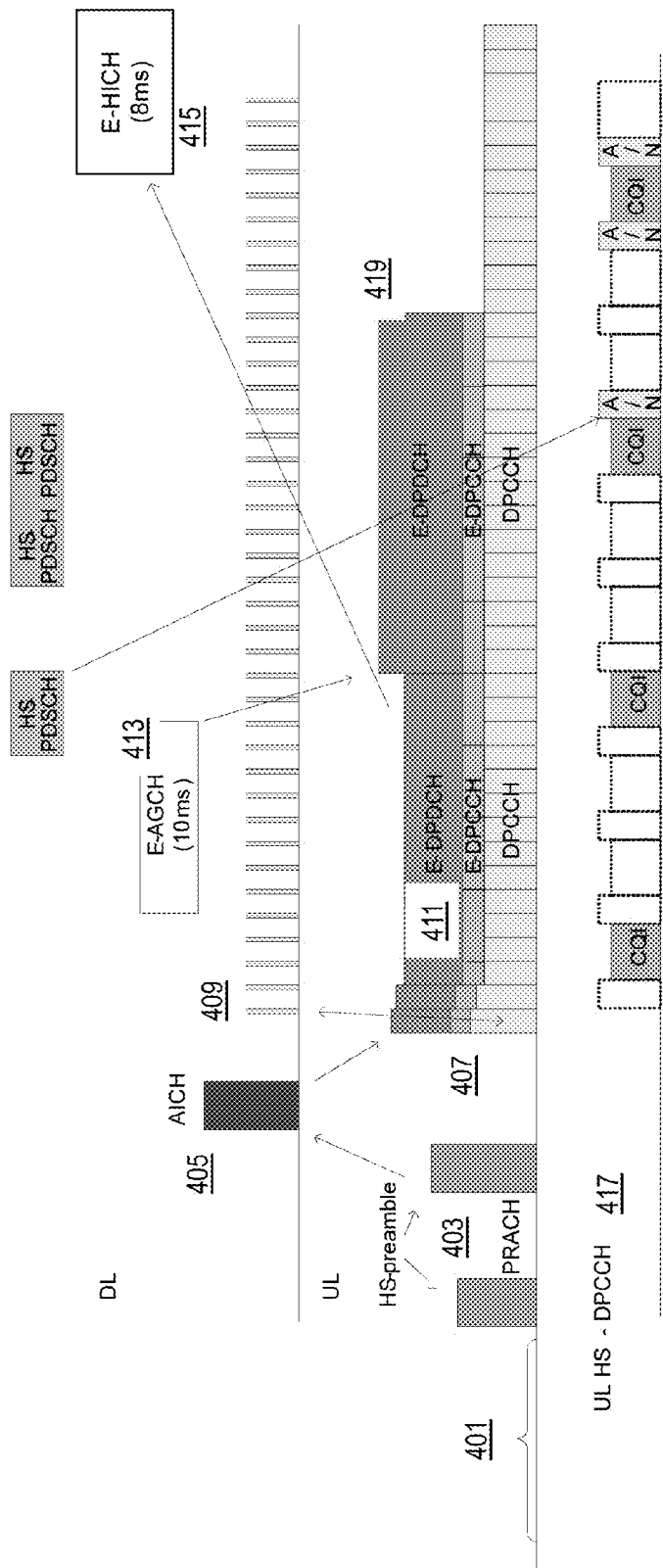
FIG. 4 is a diagram of an exemplary high speed random access channel (HS-RACH) procedure for supporting cell-re-selection, according to various exemplary embodiments.

FIG. 4 is a diagram of an exemplary high speed random access channel (HS-RACH) procedure for supporting cell-re-selection, according to various exemplary embodiments. By way of example, a High Speed Random Access Channel (HS-RACH) or Fast E-DCH access can be used as a transport channel in the CELL_FACH (Forward Access Channel) state instead of RACH. The HS-RACH concept is explained as follows. In step 401, determination of UL interference level for open loop power control is performed. In step 403, the process involves a random access procedure, R'99 (3GPP R99), with power ramp-up using specific HS-RACH access slots and/or signatures indicated in a SIB (System Information Block). The process then, per step 405, performs acquisition indication and resource assignment.

Next, the start of inner loop power control is performed in the UL 101, e.g., on a DPCCH (Dedicated Physical Control Channel), as in step 407. Also, the process proceeds with the start of inner loop power control in DL, e.g., on F-DPCH (Forward Dedicated Physical Channel (step 409). At this point, data transmission on the UL can commence, as in step 411, on, e.g., on E-DPDCH (Enhanced Dedicated Physical Data Channel)/E-DPCCH (Enhanced Dedicated Physical Control Channel). In step 413, a subsequent data rate grant (update of initial data rate grant) as well as collision detection and resolution is executed. Acknowledgement signaling (ACK (Acknowledgement)/NACK (Negative Acknowledgement)) of UL data is provided on an E-HICH (E-DCH Hybrid ARQ (Automatic Repeat Request) Indicator Channel), per step 415.

Likewise, in step 417, acknowledgement signaling (using ACK/NACK) is performed for DL data and CQI (Channel Quality Indication) for DL link adaptation, e.g., on HS-DPCCH. In step 419, the process provides certain mechanisms at the end of data transmission, end of HS-RACH resource allocation period, collision detection, etc.

To better appreciate the above process, the E-DCH resources are now described. In Release 99, the RACH channel data rates are very low and the setup times from CELL_FACH to CELL_DCH are considerable. This leads to considerable longer delays than needed for medium size packets. Using HSUPA (High Speed Uplink Packet Access) physical channel in CELL_FACH state will enhance the data rates in that state considerably. The data transfer in CELL_FACH with the enhanced data rate can continue, except for a small gap, during the switching to CELL_DCH, thus enabling the user data transmission to start during the CELL_FACH to CELL_DCH setup, thus hiding from user the fact that the setup takes some time.

Figure 5:
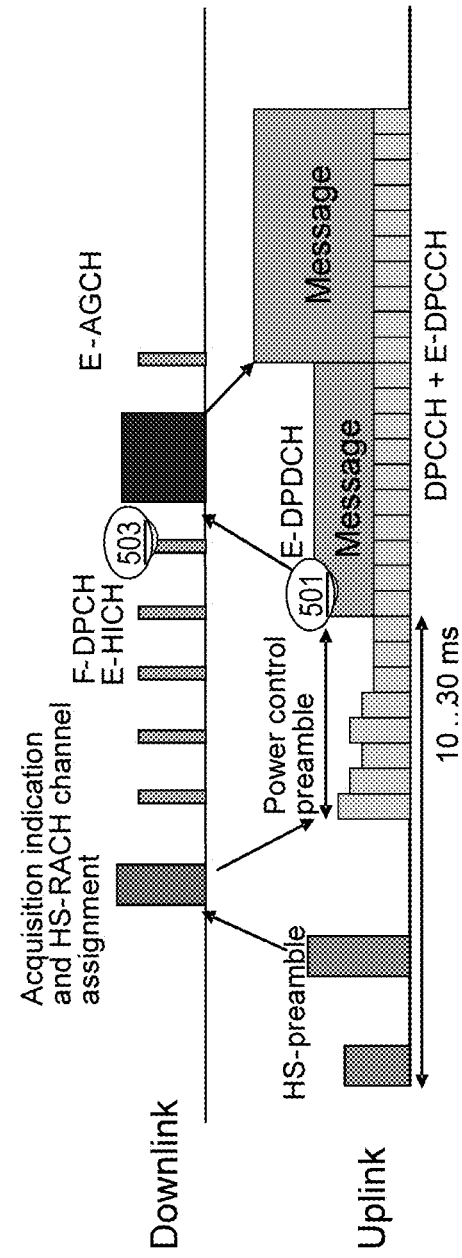
FIG. 5 is a diagram showing usage of Enhanced Dedicated Channel (E-DCH) as a RACH shared channel, according to various exemplary embodiments.

The high speed RACH (HS-RACH) concept is illustrated in FIG. 5.

FIG. 5 is a diagram showing usage of Enhanced Dedicated Channel (E-DCH) as a RACH shared channel, according to various exemplary embodiments. Physical channels are utilized as shared channels (or common channels): one or more uplink E-DPDCH and E-DPCCH are used as shared channels (501); and one or more sets of downlink L1 feedback channels are used as shared channels (503). These channels can carry power control (F-DPCH), retransmission requests (ACK/NACK) and capacity allocations (E-AGCH).

Figure 7:
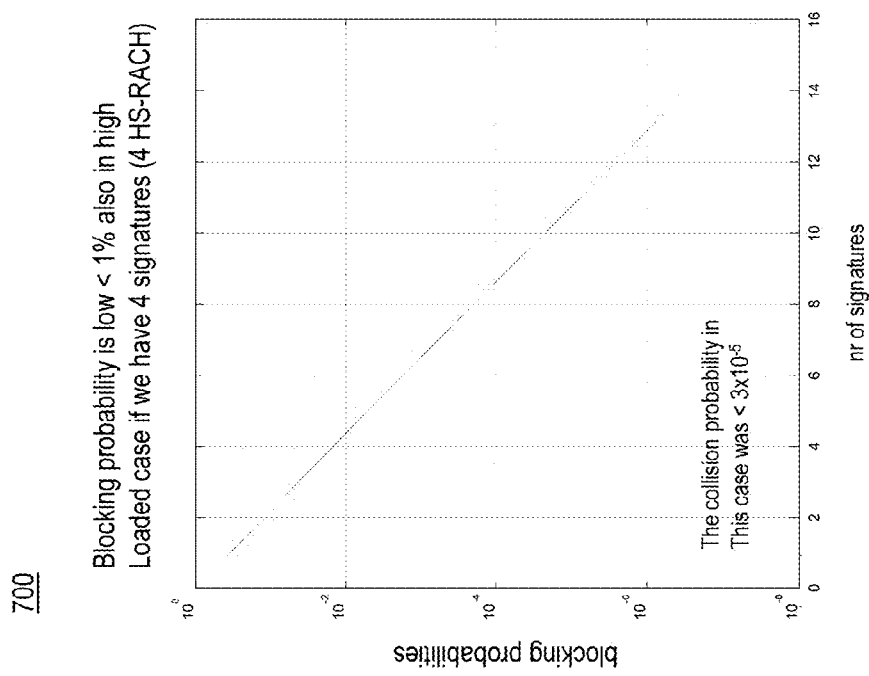
FIGS. 6 and 7 are diagrams of simulation results relating to HS-RACH capacity, according to various exemplary embodiments.
Figure 6:
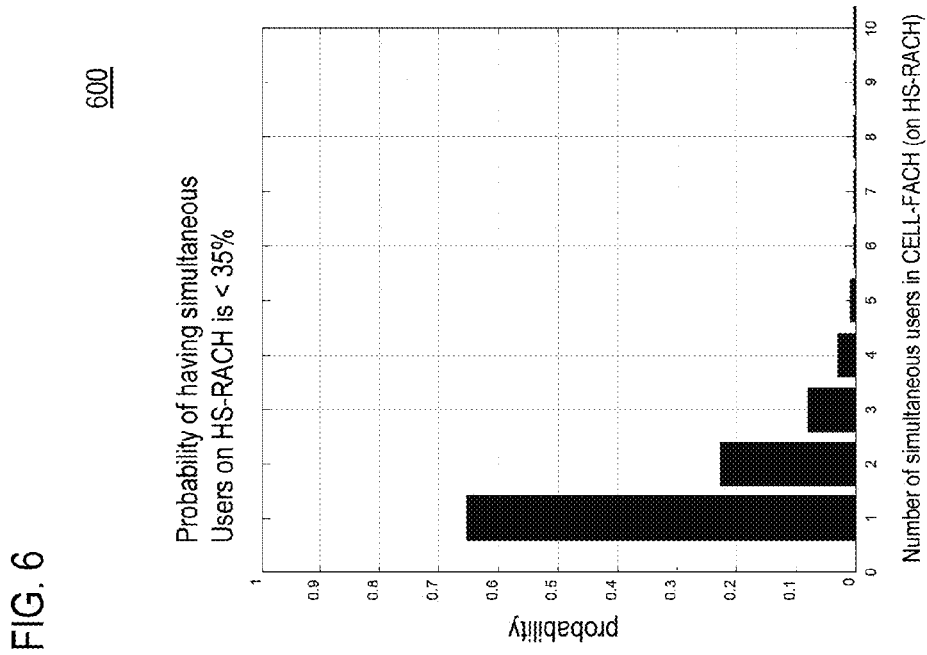

FIGS. 6 and 7 are diagrams of simulation results relating to HS-RACH capacity, according to various exemplary embodiments. HS-RACH capacity is simulated, and graph 600 of FIG. 6 and graph 700 of FIG. 7 provide the results. In these simulations, it is assumed that there are a total of 2500 uploads per cell per hour. Also, each user is assumed to stay 500 ms on HS-RACH before moving to Cell_DCH state. Further, it would be possible to start the operation with a single HS-RACH and then later upgrade the capacity according to the traffic needs. The simulations also show that if 4 signatures are in place, the collision probability is negligible <0.01% with the loading used in the simulations.

By way of example, the described processes and systems can utilize such networks as WCDMA/HSPA, and UMTS terrestrial radio access network (UTRAN), as described below. However, it is recognized that other communication architectures can be utilized as well.

FIGS. 8A-8C are diagrams of communication systems having exemplary long-term evolution (LTE) architectures, in which the user equipment (UE) and the base station of FIG. 1 can operate, according to various exemplary embodiments. By way of example (shown in FIG. 8A), a base station (e.g., destination node) and a user equipment (UE) (e.g., source node) can communicate in system 800 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (FDMA) (SC-FDMA) or a combination of thereof. In an exemplary embodiment, both uplink and downlink can utilize WCDMA. In another exemplary embodiment, uplink utilizes SC-FDMA, while downlink utilizes OFDMA. As seen, base stations 103a-103n constitute a radio network of eNBs as EUTRAN.

The communication system 800 is compliant with 3GPP LTE, entitled "Long Term Evolution of the 3GPP Radio Technology" (which is incorporated herein by reference in its entirety). As shown in FIG. 8A, one or more user equipment (UEs) communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

MME (Mobile Management Entity)/Serving Gateways 801 are connected to the eNBs 103 in a full or partial mesh configuration using tunneling over a packet transport network (e.g., Internet Protocol (IP) network) 803. Exemplary functions of the MME/Serving GW 801 include distribution of paging messages to the eNBs 103, termination of U-plane packets for paging reasons, and switching of U-plane for support of UE mobility. Since the GWs 801 serve as a gateway to external networks, e.g., the Internet or private networks 803, the GWs 801 include an Access, Authorization and Accounting system (AAA) 805 to securely determine the identity and privileges of a user and to track each user's activities. Namely, the MME Serving Gateway 801 is the key control-node for the LTE access-network and is responsible for idle mode UE tracking and paging procedure including retransmissions. Also, the MME 801 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

In FIG. 8B, a communication system 802 supports GERAN (GSM/EDGE radio access) 804, and UTRAN 806 based access networks, E-UTRAN 812 and non-3GPP (not shown) based access networks, and is more fully described in TR 23.882, which is incorporated herein by reference in its entirety. A key feature of this system is the separation of the network entity that performs control-plane functionality (MME 808) from the network entity that performs bearer-plane functionality (Serving Gateway 810) with a well defined open interface between them S11. Since E-UTRAN 812 provides higher bandwidths to enable new services as well as to improve existing ones, separation of MME 808 from Serving Gateway 810 implies that Serving Gateway 810 can be based on a platform optimized for signaling transactions. This scheme enables selection of more cost-effective platforms for, as well as independent scaling of, each of these two elements. Service providers can also select optimized topological locations of Serving Gateways 810 within the network independent of the locations of MMEs 808 in order to reduce optimized bandwidth latencies and avoid concentrated points of failure.

As seen in FIG. 8B, the E-UTRAN (e.g., eNB) 812 interfaces with UE 101 via LTE-Uu. The E-UTRAN 812 supports LTE air interface and includes functions for radio resource control (RRC) functionality corresponding to the control plane MME 808. The E-UTRAN 812 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 808, as a key control node, is responsible for managing mobility UE identifies and security parameters and paging procedure including retransmissions. The MME 808 is involved in the bearer activation/deactivation process and is also responsible for choosing Serving Gateway 810 for the UE 101. MME 808 functions include Non Access Stratum (NAS) signaling and related security. MME 808 checks the authorization of the UE 101 to camp on the service provider's Public Land Mobile Network (PLMN) and enforces UE 101 roaming restrictions. The MME 808 also provides the control plane function for mobility between LTE and 2G/3G access networks with the S3 interface terminating at the MME 808 from the SGSN (Serving GPRS Support Node) 814.

The SGSN 814 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 808 and HSS (Home Subscriber Server) 816. The S10 interface between MMEs 808 provides MME relocation and MME 808 to MME 808 information transfer. The Serving Gateway 810 is the node that terminates the interface towards the E-UTRAN 812 via S1-U.

The S1-U interface provides a per bearer user plane tunneling between the E-UTRAN 812 and Serving Gateway 810. It contains support for path switching during handover between eNBs 103. The S4 interface provides the user plane with related control and mobility support between SGSN 814 and the 3GPP Anchor function of Serving Gateway 810.

The S6 is an interface between UTRAN 806 and Serving Gateway 810. Packet Data Network (PDN) Gateway 818 provides connectivity to the UE 101 to external packet data networks, (e.g. Internet or Intranet) by being the point of exit and entry of Internet traffic for the UE 101. The PDN Gateway 818 performs policy enforcement, packet filtering for each user, charging support, lawful interception and packet screening. Another role of the PDN Gateway 818 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 820 to Policy and Charging Enforcement Function (PCEF) in the PDN Gateway 818. The SGi interface is the interface between the PDN Gateway and the operator's IP services including packet data network 822. Packet data network 822 may be an operator external public or private packet data network or an intra operator packet data network, e.g., for provision of IMS (IP Multimedia Subsystem) services. Rx+ is the interface between the PCRF and the packet data network 822.

As seen in FIG. 8C, the eNB 103 utilizes an E-UTRA (Evolved Universal Terrestrial Radio Access) (user plane, e.g., RLC (Radio Link Control) 815, MAC (Media Access Control) 817, and PHY (Physical) 819, as well as a control plane (e.g., RRC 821)). These functions are also provided within the UE 101. The eNB 103 also includes the following functions: Inter Cell RRM (Radio Resource Management) 823, Connection Mobility Control 825, RB (Radio Bearer) Control 827, Radio Admission Control 829, eNB Measurement Configuration and Provision 831, and Dynamic Resource Allocation (Scheduler) 833.

The eNB 103 communicates with the aGW 801 (Access Gateway) via an S1 interface. The aGW 801 includes a Control plane 801a and a User Plane 801b. aGW is a conceptual notation inclusive of MME in the control plane and PDN/serving gateways in the user plane. Evolve Packet Core is the core network architecture that in addition to MME and PDN/serving gateways consists of server architecture e.g. for Internet Multimedia Subsystem (IMS).

The user plane 801b includes PDN/Serving gateway functionalities 845, e.g. management of PDP context (Packet Data Protocol context) 840, and a User plane Mobility Anchoring function 847. It is noted that the functionality of the aGW 801 can also be provided by a combination of a serving gateway (SGW) and a packet data network (PDN) GW. The aGW 801 can also interface with a packet network, such as the Internet 843. PDP (Packet Data protocol) context defines the IP connectivity parameters e.g. QoS.

The control plane 801b provides the following components as the Mobility Management Entity (MME): SAE (System Architecture Evolution) Bearer Control 851, Idle State Mobility Handling 853, and NAS (Non-Access Stratum) Security 855.

One of ordinary skill in the art would recognize that the processes for coverage area re-selection may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 9.

Figure 9:
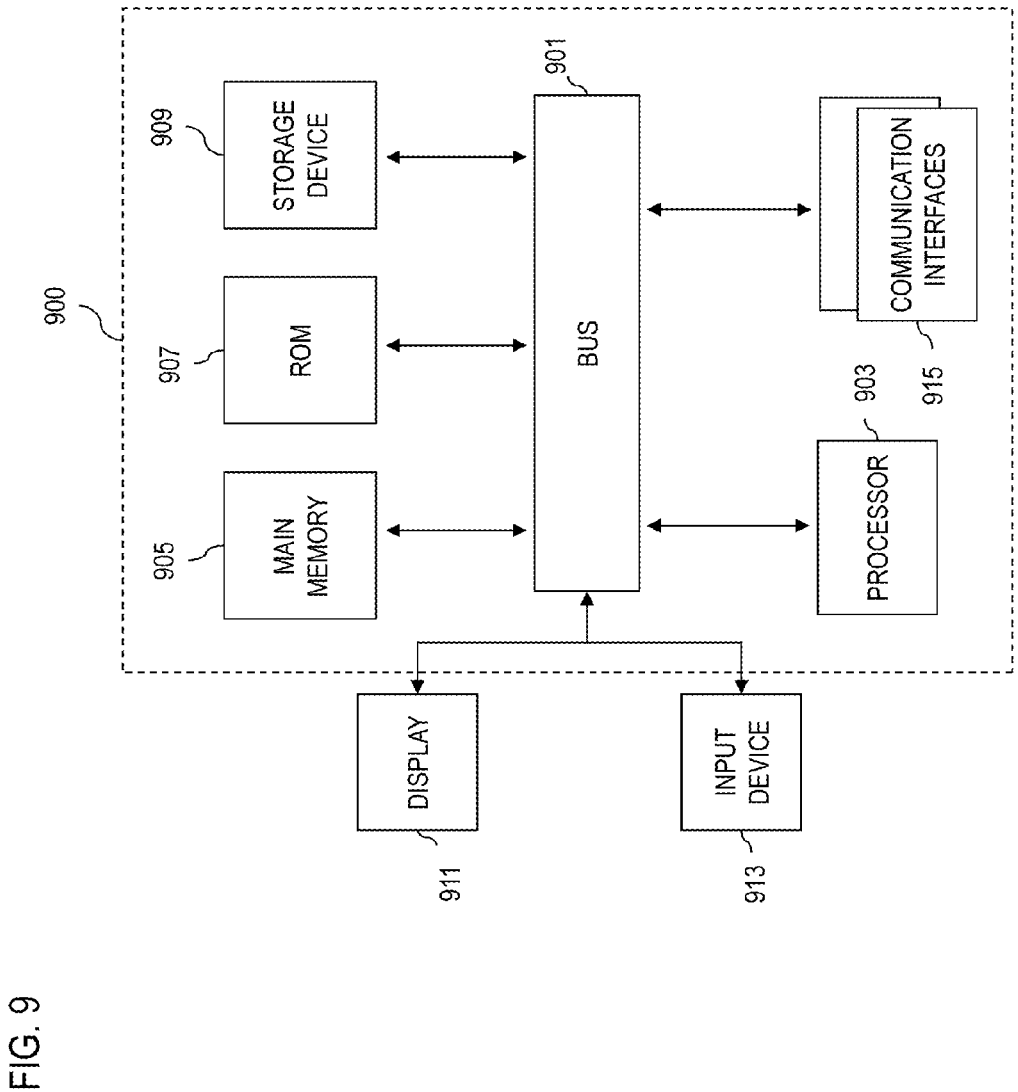
FIG. 9 is a diagram of hardware that can be used to implement an embodiment of the invention.

FIG. 9 illustrates exemplary hardware upon which various embodiments of the invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
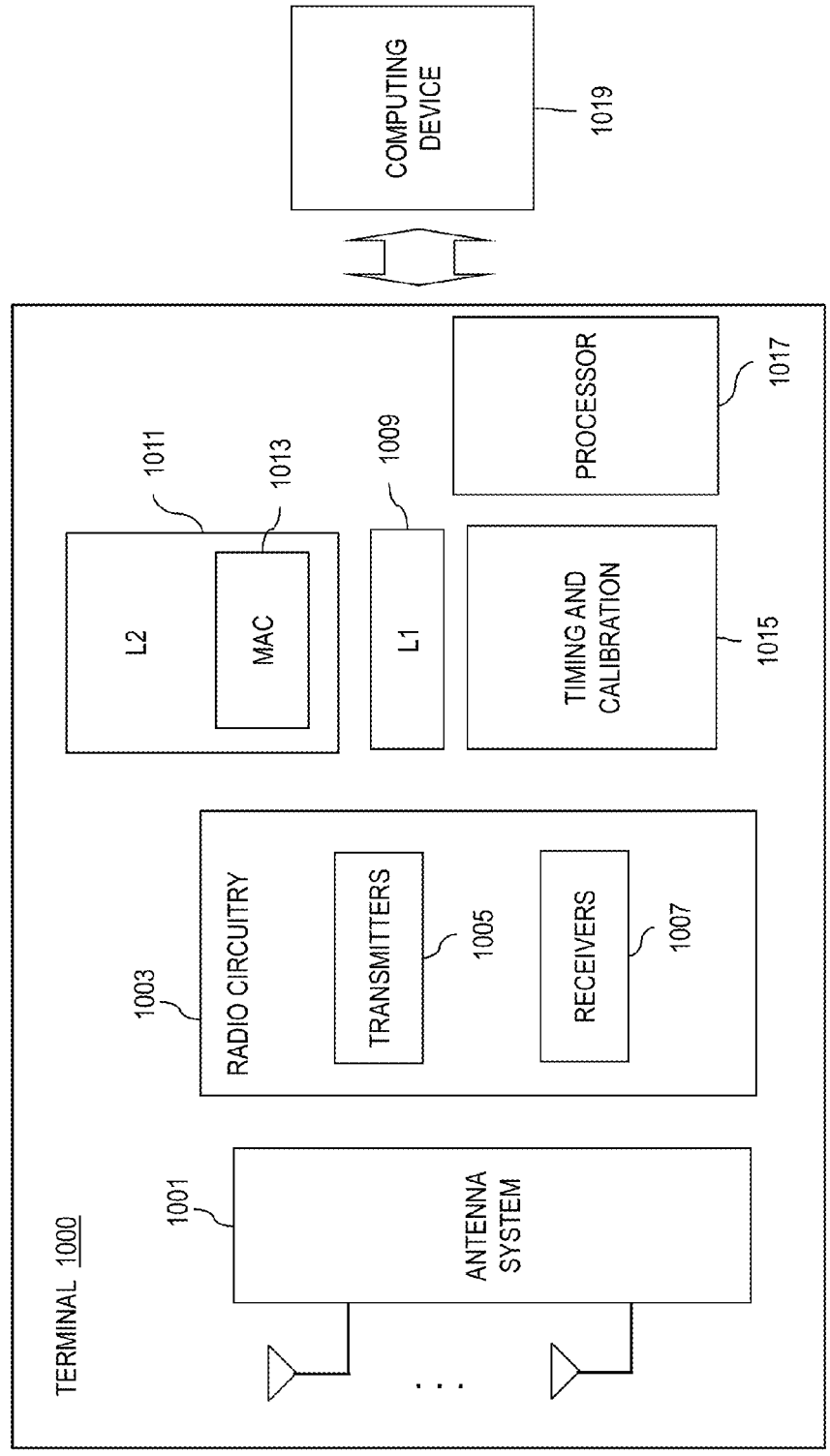
FIG. 10 is a diagram of exemplary components of a user terminal configured to operate in the systems of FIGS. 8A-8C, according to an embodiment of the invention.

FIG. 10 is a diagram of exemplary components of a user terminal configured to operate in the systems of FIGS. 8A-8C, according to an embodiment of the invention. A user terminal 1000 includes an antenna system 1001 (which can utilize multiple antennas) to receive and transmit signals. The antenna system 1001 is coupled to radio circuitry 1003, which includes multiple transmitters 1005 and receivers 1007. The radio circuitry encompasses all of the Radio Frequency (RF) circuitry as well as base-band processing circuitry. As shown, layer-1 (L1) and layer-2 (L2) processing are provided by units 1009 and 1011, respectively. Optionally, layer-3 functions can be provided (not shown). L2 unit 1011 can include module 1013, which executes all Medium Access Control (MAC) layer functions. A timing and calibration module 1015 maintains proper timing by interfacing, for example, an external timing reference (not shown). Additionally, a processor 1017 is included. Under this scenario, the user terminal 1000 communicates with a computing device 1019, which can be a personal computer, work station, a Personal Digital Assistant (PDA), web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    upon movement to another coverage area from a current coverage area, determining, by a user equipment, whether the user equipment is in a coverage area re-selection state;
    determining whether Enhanced Dedicated Channel (E-DCH) transmission resources are currently assigned to the user equipment in the current coverage area;
    executing, by the user equipment, a coverage area re-selection procedure when the user equipment is in the coverage area re-selection state upon the movement to the other coverage area and no E-DCH transmission resource is currently assigned to the user equipment in the current coverage area; and
    not executing, by the user equipment, the coverage area re-selection procedure when the user equipment is in the coverage area re-selection state upon the movement to the other coverage area and the E-DCH transmission resource is currently assigned to the user equipment in the current coverage area.

2. The method according to claim 1, wherein the current coverage area is associated with a cellular network.

3. The method according to claim 1, the method further comprising:
    when an E-DCH transmission resource is currently assigned to the user equipment in the current coverage area, releasing, by the user equipment, the dedicated resource within the current coverage area; and
    executing, by the user equipment, the coverage area re-selection procedure.

4. The method according to claim 3, wherein the current coverage area is associated with a cellular network.

5. A non-transitory computer-readable storage medium carrying one or more sequences of one or more instructions which, when executed by one or more processors, cause an apparatus to perform the following steps:
    upon movement to another coverage area from a current coverage area,
    determining whether a user equipment is in a coverage area re-selection state;
    determining whether Enhanced Dedicated Channel (E-DCH) transmission resources are currently assigned to the user equipment in the current coverage area;
    executing coverage area re-selection procedure when the user equipment is in the coverage area re-selection state upon the movement to the other coverage area and no E-DCH transmission resource is currently assigned to the user equipment in the current coverage area,
    wherein the apparatus is included in the user equipment; and
    not executing, by the user equipment, the coverage area re-selection procedure when the user equipment is in the coverage area re-selection state upon the movement to the other coverage area and the E-DCH transmission resource is currently assigned to the user equipment in the current coverage area.

6. The non-transitory computer-readable storage medium according to claim 5, wherein the current coverage area is associated with a cellular network.

7. The non-transitory computer-readable storage medium according to claim 5, wherein the apparatus is caused to further perform:
    when an E-DCH transmission resource is currently assigned to the user equipment in the current coverage area, releasing the dedicated resource within the current coverage area; and
    executing the coverage area re-selection procedure.

8. The non-transitory computer-readable storage medium according to claim 7, wherein the current coverage area is associated with a cellular network.

9. An apparatus comprising:
at least one processor; and
at least one memory including computer program code for one or more programs,
the at least one memory and the computer program code configured to, with the at least one processor, cause the apparatus to perform at least the following,
upon movement to another coverage area from a current coverage area, determine whether a user equipment is in a coverage area re-selection state;
determine whether Enhanced Dedicated Channel (E-DCH) transmission resources are currently assigned to the user equipment in the current coverage area;
execute a coverage area re-selection procedure when the user equipment is in the coverage area re-selection state upon the movement to the other coverage area and no E-DCH transmission resource is currently assigned to the user equipment in the current coverage area,
wherein the apparatus is included in the user equipment; and
not executing, by the user equipment, the coverage area re-selection procedure when the user equipment is in the coverage area re-selection state upon the movement to the other coverage area and the E-DCH transmission resource is currently assigned to the user equipment in the current coverage area.

10. The apparatus according to claim 9, wherein the current coverage area is associated with a cellular network.

11. The apparatus according to claim 9, wherein the apparatus is further caused to:
when an E-DCH transmission resource is currently assigned to the user equipment in the current coverage area, release the dedicated resource within the current coverage area; and
execute the coverage area re-selection procedure.

12. The apparatus according to claim 11, wherein the current coverage area is associated with a cellular network.

* * * * *